US007953509B2

(12) United States Patent
Murayama

(10) Patent No.: US 7,953,509 B2
(45) Date of Patent: May 31, 2011

(54) POWER ASSIST APPARATUS AND CONTROL METHOD THEREOF

(75) Inventor: Hideyuki Murayama, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 295 days.

(21) Appl. No.: 12/392,701

(22) Filed: Feb. 25, 2009

(65) Prior Publication Data

US 2009/0216378 A1 Aug. 27, 2009

(51) Int. Cl.
| A47B 85/00 | (2006.01) |
| A47B 11/00 | (2006.01) |
| B25B 1/22 | (2006.01) |
| A47F 5/12 | (2006.01) |
| B65B 35/50 | (2006.01) |
| B64F 5/00 | (2006.01) |
| A01D 90/00 | (2006.01) |
| A47H 1/10 | (2006.01) |
| F16M 13/00 | (2006.01) |
| G05B 19/18 | (2006.01) |
| G05B 15/00 | (2006.01) |
| G06F 19/00 | (2006.01) |

(52) U.S. Cl. .......... 700/114; 700/60; 700/228; 700/260; 700/261; 248/317; 248/550; 414/579; 414/589; 414/788; 269/74; 269/75; 269/81; 108/1; 108/20; 108/139; 901/15; 901/19; 901/34; 901/46

(58) Field of Classification Search ........ 700/60, 700/114, 228, 260, 261; 248/317, 550; 414/579, 414/589, 788; 269/74, 75, 81; 108/1, 20, 108/139; 901/15, 19, 34, 46
See application file for complete search history.

(56) References Cited

U.S. PATENT DOCUMENTS

| 4,884,938 | A | * | 12/1989 | Fujita et al. | 414/541 |
| 5,112,184 | A | * | 5/1992 | Tapper et al. | 414/728 |
| 5,155,423 | A | * | 10/1992 | Karlen et al. | 318/568.11 |
| 5,489,032 | A | * | 2/1996 | Mayhall et al. | 212/285 |
| 5,806,518 | A | * | 9/1998 | Mittelstadt | 600/407 |
| 5,915,673 | A | * | 6/1999 | Kazerooni | 254/270 |
| 6,061,890 | A | * | 5/2000 | Shashlo et al. | 29/434 |
| 6,222,338 | B1 | * | 4/2001 | Villaret | 318/568.13 |
| 6,386,513 | B1 | * | 5/2002 | Kazerooni | 254/270 |
| 6,430,473 | B1 | * | 8/2002 | Lee et al. | 700/245 |
| 6,813,542 | B2 | * | 11/2004 | Peshkin et al. | 700/245 |
| 7,143,494 | B2 | * | 12/2006 | Savoy | 29/407.1 |

(Continued)

FOREIGN PATENT DOCUMENTS

JP 3-126527 U 12/1991

(Continued)

*Primary Examiner* — Ronald D Hartman, Jr.
(74) *Attorney, Agent, or Firm* — Kenyon & Kenyon LLP

(57) ABSTRACT

In a control method for a power assist apparatus, a pressing force acting on a workpiece held by a workpiece holding apparatus is detected, a determination is made as to whether or not the detected pressing force exceeds a preset threshold, a determination is made as to whether or not a dead man switch provided on the workpiece holding apparatus is ON, and a determination as to whether or not to release a rotation restriction applied to a joint portion for connecting the workpiece holding apparatus rotatably to an arm is made in accordance with a result of the determination as to whether or not the detected pressing force exceeds the preset threshold and a result of the determination as to whether or not the dead mean switch is ON.

4 Claims, 14 Drawing Sheets

U.S. PATENT DOCUMENTS

| | | | |
|---|---|---|---|
| 7,461,753 B1* | 12/2008 | Gatta et al. | 212/331 |
| 7,664,570 B2* | 2/2010 | Suita et al. | 700/245 |
| 2004/0111183 A1* | 6/2004 | Sutherland et al. | 700/245 |
| 2005/0080495 A1* | 4/2005 | Tessier et al. | 700/63 |
| 2010/0183414 A1* | 7/2010 | Konosu et al. | 414/589 |

FOREIGN PATENT DOCUMENTS

| | | |
|---|---|---|
| JP | 05-008187 A | 1/1993 |
| JP | 05-069358 A | 3/1993 |
| JP | 06-087476 A | 3/1994 |
| JP | 07-137675 A | 5/1995 |
| JP | 09-207086 A | 8/1997 |
| JP | 11-240474 A | 9/1999 |
| JP | 11-245124 A | 9/1999 |
| JP | 2005-125427 A | 5/2005 |
| JP | 2006-024150 A | 1/2006 |
| JP | 2006-218573 A | 8/2006 |
| JP | 2006-247794 A | 9/2006 |
| JP | 2007-038059 A | 2/2007 |
| JP | 2007-038314 A | 2/2007 |
| JP | 2009-039815 A | 2/2009 |

* cited by examiner

FIG. 1
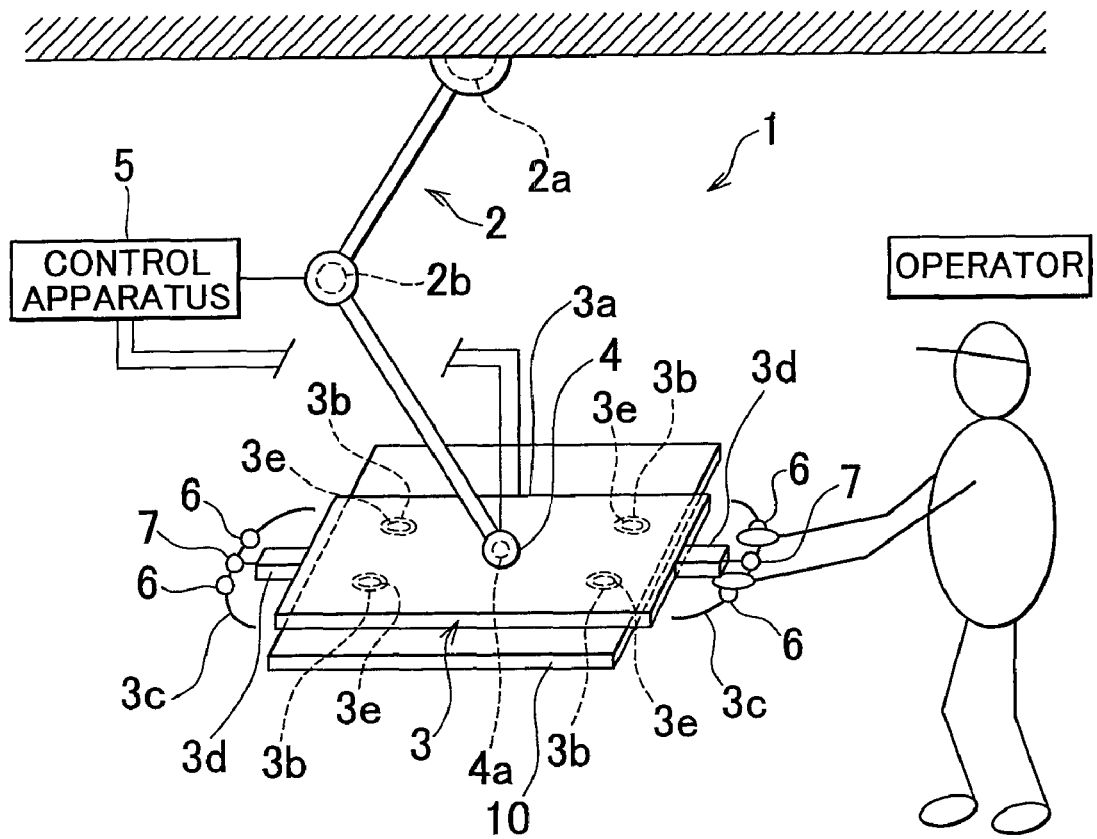
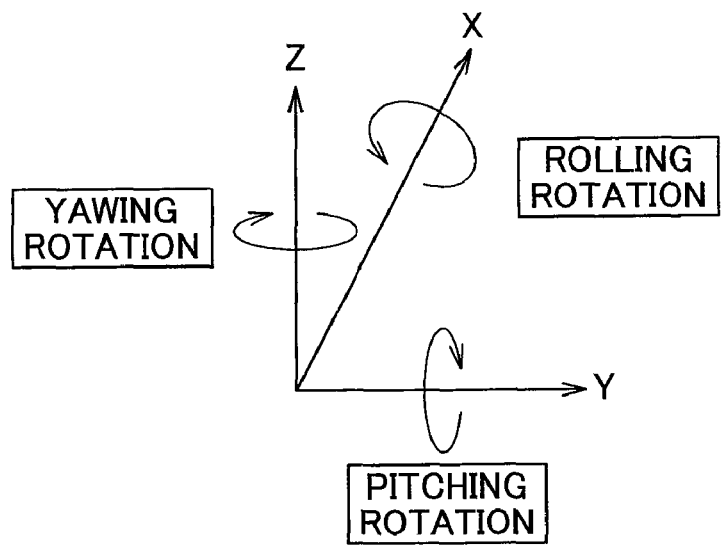

FIG. 2
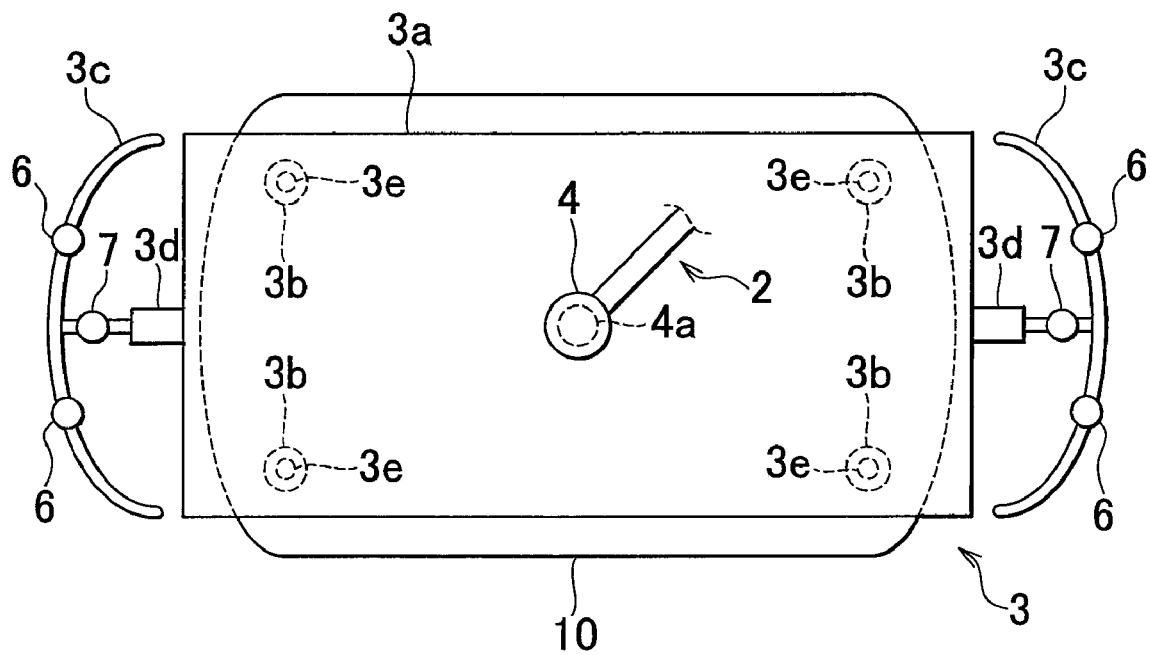
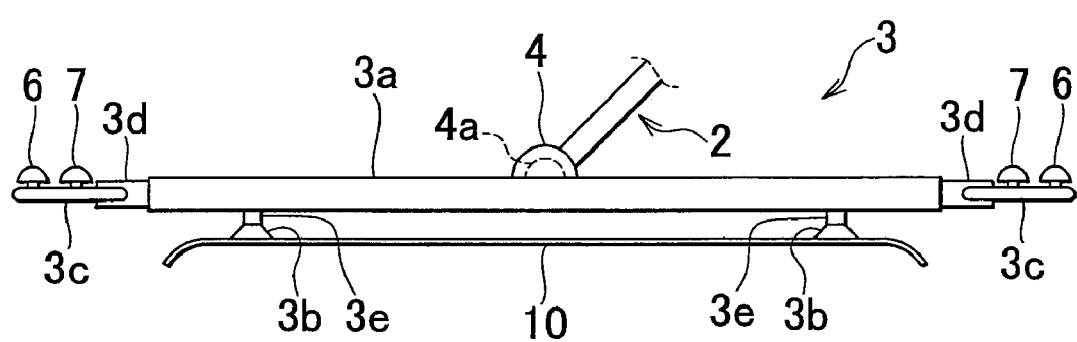

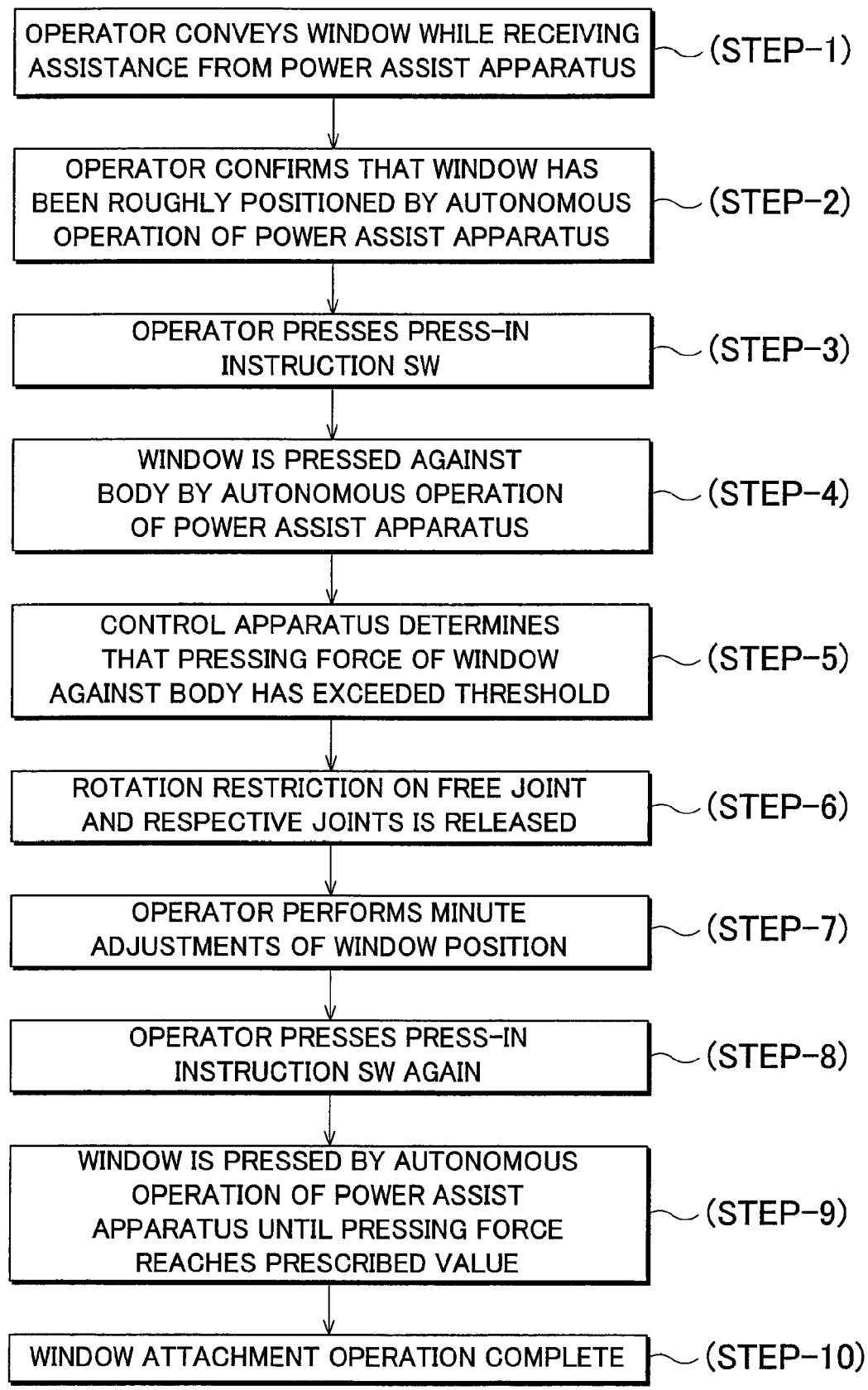

FIG. 7

| | PRESSURE DETECTED BY CONTACT PRESSURE SENSORS (Fe1 TO Fe4) | SUM TOTAL OF PRESSURE DETECTED BY CONTACT PRESSURE SENSORS (Fe1 TO Fe4) | DEAD MAN SW | FREE JOINT |
|---|---|---|---|---|
| Step-1 | — | — | — | LOCKED |
| Step-2 | — | — | — | LOCKED |
| Step-3 | — | — | — | LOCKED |
| Step-4 | — | — | — | LOCKED |
| Step-5 | — | — | — | LOCKED |
| Step-6 | not (Fe1, or Fe2, or Fe3, or Fe4)>Fc | not (Fe1+Fe2+Fe3+Fe4)>Ft) | — | LOCKED |
| | Fe1, or Fe2, or Fe3, or Fe4>Fc | Fe1+Fe2+Fe3+Fe4>Ft | OFF | LOCKED |
| | Fe1, or Fe2, or Fe3, or Fe4>Fc | Fe1+Fe2+Fe3+Fe4>Ft | ON | FREE |
| Step-7 | Fe1, or Fe2, or Fe3, or Fe4>Fc | Fe1+Fe2+Fe3+Fe4>Ft | OFF | LOCKED |
| | Fe1, or Fe2, or Fe3, or Fe4>Fc | Fe1+Fe2+Fe3+Fe4>Ft | ON | FREE |
| Step-8 | — | — | — | LOCKED |
| Step-9 | — | — | — | LOCKED |
| Step-10 | — | — | — | LOCKED |

POWER ASSIST APPARATUS AND CONTROL METHOD THEREOF

INCORPORATION BY REFERENCE

The disclosure of Japanese Patent Application No. 2008-45010 filed on Feb. 26, 2008, including the specification, drawings and abstract is incorporated herein by reference in its entirety.

BACKGROUND OF THE INVENTION

1. Field of the Invention

The invention relates to a power assist apparatus and a control method for a power assist apparatus.

2. Description of the Related Art

In manufacturing sites and the like for manufacturing industrial products, a power assist apparatus is used as an apparatus for assisting an operator in the conveyance of heavy loads (workpieces). A workpiece attachment operation includes conveyance and positioning of the workpiece, but when the workpiece is conveyed cooperatively by the operator and the power assist apparatus, the power required to convey the workpiece can be provided by the power assist apparatus. Moreover, by teaching the power assist apparatus, positioning of the workpiece can be performed efficiently. Hence, through use of a power assist apparatus, the workload of the operator can be reduced and an improvement in operability can be achieved. For example, Japanese Patent Application No. 11-245124 (JP-A-11-245124) discloses a power assist apparatus that detects an incline (angle) of a workpiece holding apparatus for holding a workpiece serving as a conveyance subject and drives the workpiece holding apparatus in an up-down direction.

When it is determined in the power assist apparatus described above that the operator has removed his/her hand from the workpiece holding apparatus, respective joint portions of the power assist apparatus are locked to maintain the attitude (incline and conveyance direction) of the workpiece holding apparatus and the workpiece. Further, when it is determined that the operator has gripped the workpiece holding apparatus, the locks on the respective joint portions of the power assist apparatus are released so that the operator can modify the attitude (incline and conveyance direction) of the workpiece holding apparatus and the workpiece freely.

When workpiece positioning is performed using this type of power assist apparatus, the position of the workpiece can be corrected freely through an operation performed by the operator while gripping the workpiece holding apparatus. However, depending on the state of balance (center of gravity position) of the workpiece, the workpiece may tilt unexpectedly about the respective joint portions as soon as the locks on the respective joint portions are released when the operator grips the workpiece holding apparatus. In this case, the operator may be unable to support this displacement, and as a result, the workpiece may contact an attachment subject member, causing either the workpiece or the attachment subject member to break.

Furthermore, allowing the operator to correct the position of the workpiece freely while gripping the workpiece holding apparatus means that the workpiece may wobble during conveyance, depending on the operation of the operator. Therefore, if the operator makes a mistake, the workpiece may contact the attachment subject member or a peripheral portion thereof. Hence, with the power assist apparatus described above, the operator must convey the workpiece while taking great care to adjust the attitude of the workpiece in situations where the workpiece must be conveyed through a gap or the like, for example, and in such cases, a reduction in conveyance efficiency may occur.

SUMMARY OF THE INVENTION

To improve the efficiency with which a workpiece is conveyed by a power assist apparatus and improve positioning accuracy when the workpiece is attached using the power assist apparatus, the invention provides a power assist apparatus and a control method thereof with which the attitude of the workpiece can be stabilized during conveyance and fine positioning can be performed by an operator.

A first aspect of the invention provides a control method for a power assist apparatus. In this control method, a pressing force acting on a workpiece held by a workpiece holding apparatus is detected, a determination is made as to whether or not the detected pressing force exceeds a preset threshold, and a determination is made as to whether or not a dead man switch provided on the workpiece holding apparatus is ON. A determination as to whether or not to release a rotation restriction on a joint portion for connecting the workpiece holding apparatus rotatably to an arm is then made in accordance with a result of the determination as to whether or not the detected pressing force exceeds the preset threshold and a result of the determination as to whether or not the dead man switch is ON.

According to the first aspect of the invention, the attitude of the workpiece can be stabilized during conveyance. As a result, an operator can convey the workpiece smoothly, enabling an improvement in the efficiency of the conveyance operation. Further, contact between the workpiece and an attachment subject member during conveyance can be prevented, and therefore breakage of or damage to the workpiece or the attachment subject member can be prevented.

During detection of the pressing force, a plurality of pressing forces acting on the workpiece may be detected in a plurality of holding portions provided in the workpiece holding apparatus. In the determination as to whether or not the pressing force exceeds the preset threshold, a determination may be made as to whether or not the pressing force of at least one holding portion exceeds a preset first threshold, and a determination may be made as to whether or not a sum total of the pressing forces of the plurality of holding portions exceeds a preset second threshold.

In so doing, minute adjustments to the attachment position can be made by the operator after the attitude of the workpiece is stabilized during conveyance, and as a result, the attitude of the workpiece can be stabilized during conveyance and positioning accuracy can be secured.

The second threshold may be set to be twice the value of the first threshold.

In so doing, the attitude of the workpiece can be stabilized reliably during conveyance. Furthermore, minute adjustments to the attachment position can be made by the operator after the attitude of the workpiece has been reliably stabilized.

A second aspect of the invention provides a power assist apparatus including a workpiece holding portion having a plurality of holding portions for holding a workpiece, an arm for supporting the workpiece holding portion, a joint portion for connecting the workpiece holding portion rotatably to the arm, a brake that is capable of restricting rotation of the joint portion, a control apparatus for controlling the rotation restriction applied to the joint portion by the brake, a plurality of pressing force detection sensors which are provided respectively in the plurality of holding portions and detect a pressing force acting on the workpiece, and a dead man switch provided on the workpiece holding portion. When at least one pressing force of a plurality of pressing forces detected by the pressing force detection sensors of the plurality of holding portions exceeds a preset first threshold, a sum total of the plurality of pressing forces exceeds a preset second threshold, and the dead man switch is ON, the control apparatus releases the rotation restriction applied to the joint portion by the brake.

According to the second aspect of the invention, the attitude of the workpiece can be stabilized during conveyance. As a result, the operator can convey the workpiece smoothly, enabling an improvement in the efficiency of the conveyance operation. Further, contact between the workpiece and the attachment subject member during conveyance can be prevented, and therefore breakage of or damage to the workpiece or the attachment subject member can be prevented. Moreover, minute adjustments to the attachment position can be made by the operator after the attitude of the workpiece is stabilized during conveyance, and as a result, the attitude of the workpiece can be stabilized during conveyance and positioning accuracy can be secured.

The second threshold may be set to be twice the value of the first threshold.

In so doing, the attitude of the workpiece can be stabilized reliably during conveyance. Furthermore, minute adjustments to the attachment position can be made by the operator after the attitude of the workpiece has been reliably stabilized.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 1 is a schematic diagram showing the overall constitution of a power assist apparatus according to an embodiment of the invention;

FIG. 2 is a schematic plan view and a schematic side view showing a workpiece holding apparatus according to an embodiment of the invention;

FIG. 6 is an operation flowchart showing an example of a window attachment operation using the power assist apparatus;

FIG. 7 is an illustrative view showing a restriction state of a free joint of the power assist apparatus according to an embodiment of the invention at each step;

DETAILED DESCRIPTION OF EMBODIMENTS

Figure 3:
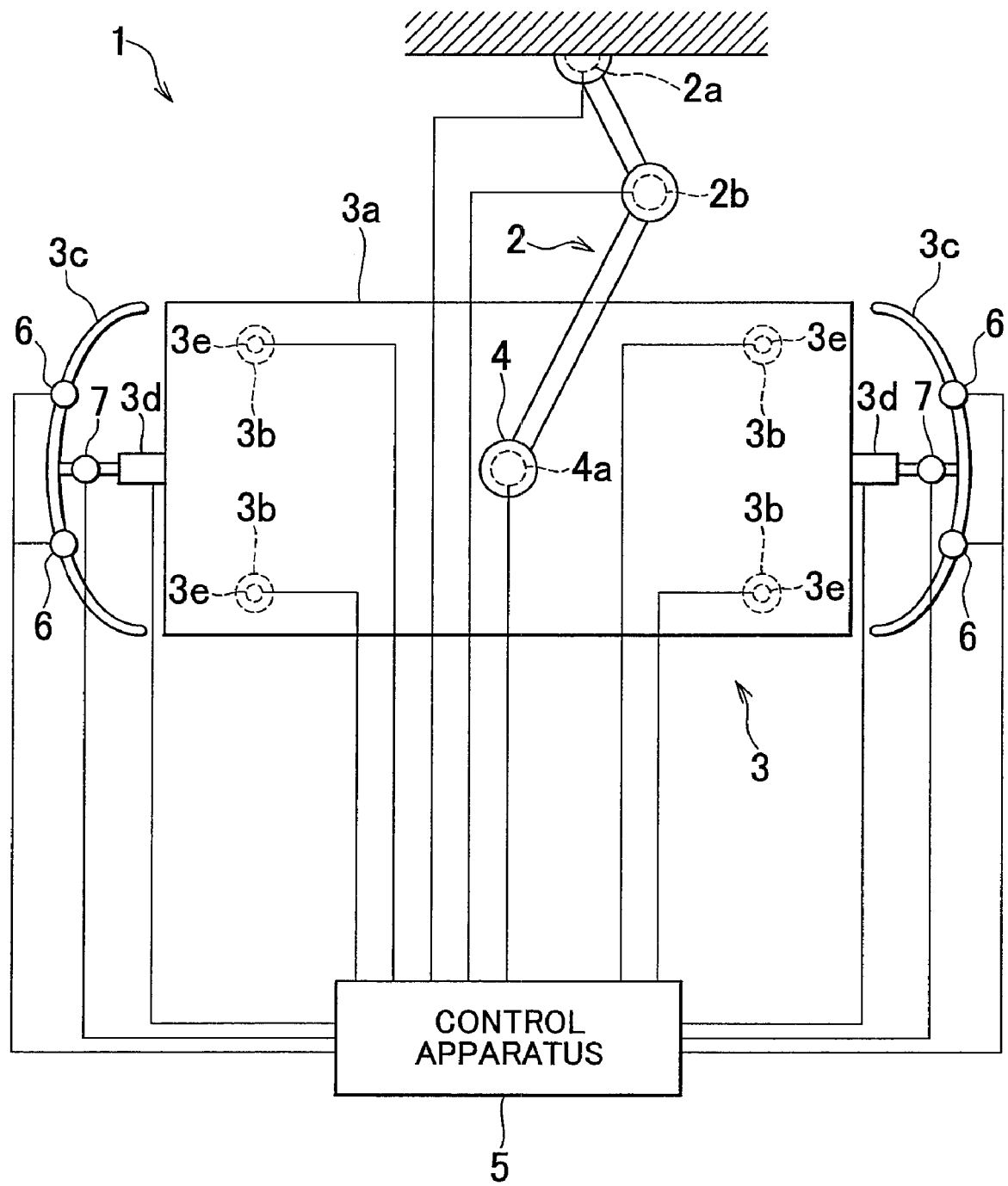
FIG. 3 is a schematic diagram showing a connection condition of a control apparatus according to an embodiment of the invention.

First, the overall constitution of a power assist apparatus 1 according to an embodiment of the invention will be described using FIGS. 1 to 3. FIG. 1 is a schematic diagram showing the overall constitution of the power assist apparatus according to an embodiment of the invention. FIG. 2 is a schematic plan view and a schematic side view showing a workpiece holding apparatus according to an embodiment of the invention. FIG. 3 is a schematic diagram showing a connection condition of a control apparatus according to an embodiment of the invention. Note that for ease of description, it is assumed that the power assist apparatus is provided on an XYZ coordinate system shown in FIG. 1, wherein rotation about the X axis denotes rolling rotation, rotation about the Y axis denotes pitching rotation, and rotation about the Z axis denotes yawing rotation. As shown in FIG. 1, the power assist apparatus 1 according to this embodiment is constituted by an articulated robot 2, a workpiece holding apparatus 3, a free joint 4, a control apparatus 5, a dead man switch 6, a press-in instruction switch 7, and so on.

The articulated robot 2 according to this embodiment is supported so as to hang from a ceiling surface or the like, and includes motors 2a, 2b on joint parts thereof. Note that the articulated robot 2 according to this embodiment is supported fixedly on a ceiling surface, but may be supported by a hoist or the like to be capable of travel, for example. Further, the robot used in the power assist apparatus 1 is not limited to the articulated robot 2, and any other robot may be used as long as it is capable of supporting the workpiece holding apparatus 3 via the free joint 4.

As shown in FIGS. 1 and 2, the workpiece holding apparatus 3 includes a substantially flat plate-shaped main body portion 3a, a sucker 3b serving as a holding portion for holding a window 10 serving as a conveyance subject (workpiece), a handle 3c, a force sensor 3d, a contact pressure sensor 3e, and so on, and is connected to the articulated robot 2 via the free joint 4, which is fixed to the main body portion 3a.

The sucker 3b is formed such that a suction action thereof can be switched ON and OFF. Furthermore, the contact pressure sensor 3e is built into the sucker 3b such that the sucker 3b is capable of detecting a pressure (a reaction force) received when the suction-held window 10 comes into contact with its surroundings. Further, the force sensor 3d is provided on a base portion of the handle 3c, which serves as a gripping portion gripped by the operator.

Further, the dead man switch 6 is provided on the handle 3c of the workpiece holding apparatus 3. The dead man switch 6 is disposed in a position where it can be operated naturally by the operator while gripping the handle 3c, and is provided to detect the gripping state (i.e. the operation state) of the workpiece holding apparatus 3 by the operator. Note that this embodiment illustrates an example in which the dead man switch 6 is provided in a total of four locations on the handle 3c, but the invention is not limited by the disposal locations and number of the dead man switch 6.

Further, the press-in instruction switch 7 is provided on the handle 3c of the workpiece holding apparatus 3. The press-in instruction switch 7 is pressed by the operator after the operator has confirmed that the window 10 has been roughly positioned. When the press-in instruction switch 7 is pressed, the power assist apparatus 1 shifts to a press-in operation. Note that this embodiment illustrates an example in which the press-in instruction switch 7 is provided in a total of two locations on the handle 3c, but the invention is not limited by the disposal locations and number of the press-in instruction switch 7.

The free joint 4 is a joint member capable of rotating freely in all rotation directions, i.e. rolling, pitching, and yawing directions. Further, the free joint 4 is provided with a brake mechanism 4a such that rotation in each of the rolling, pitching and yawing rotation directions can be restricted individually on the basis of a command from the control apparatus 5.

The power assist apparatus 1 is a robot in which multiple degrees of freedom are formed by connecting the workpiece holding apparatus 3 to the articulated robot 2 via the free joint 4, and constitutes a conveyor for conveying the window 10 using the articulated robot 2, the workpiece holding apparatus 3, the free joint 4, the control apparatus 5, and so on. Note that the robot to which the invention is applied is not limited to a robot having multiple degrees of freedom, and may be a robot having only one degree of freedom.

The control apparatus 5 is connected to the articulated robot 2, the workpiece holding apparatus 3, the free joint 4, and so on. The connection condition between the control apparatus 5 and the respective units will now be described in further detail. As shown in FIG. 3, the control apparatus 5 is connected to the motors 2a, 2b of the articulated robot 2, the force sensor 3d and the contact pressure sensor 3e of the workpiece holding apparatus 3, the brake mechanism 4a of the free joint 4, the dead man switch 6, the press-in instruction switch 7, and so on.

By connecting the control apparatus 5 to the motors 2a, 2b of the articulated robot 2, the attitude of the articulated robot 2 is controlled on the basis of an instruction from the control apparatus 5. By connecting the control apparatus 5 to the force sensor 3d of the workpiece holding apparatus 3, the control apparatus 5 detects an operation direction, an operating force, and so on of the workpiece holding apparatus 3 generated when the operator grips the handle 3c and operates the workpiece holding apparatus 3 in a desired direction. In other words, when detection information relating to the operating condition of the operator is input into the control apparatus 5 by the force sensor 3d, the control apparatus 5 determines the desired operation direction of the operator on the basis of this detection information, and controls an operation of the motor 2a to control the attitude of the articulated robot 2. Note that in this embodiment, a six component load cell is used as the force sensor 3d.

By connecting the control apparatus 5 to the contact pressure sensor 3e of the workpiece holding apparatus 3, the control apparatus 5 determines from the detected pressure detected by the contact pressure sensor 3e whether or not the window 10 is pressed against the body in an attachment subject position with a pressing force corresponding to a prescribed value. Further, by detecting bias in the detected pressure values detected by the plurality of contact pressure sensors 3e, the control apparatus 5 determines whether or not the window 10 is pressed against the body evenly.

By connecting the control apparatus 5 to the brake mechanism 4a of the free joint 4, rotation of the free joint 4 is restricted or permitted on the basis of an instruction from the control apparatus 5. Thus, the attitude of the workpiece holding apparatus 3 can be restricted.

By connecting the control apparatus 5 to the dead man switch 6, the control apparatus 5 detects the gripping state of the operator in relation to the workpiece holding apparatus 3. More specifically, when an ON (or OFF) signal is input into the control apparatus 5 from the dead man switch 6, the control apparatus 5 determines whether or not the operator is gripping the workpiece holding apparatus 3 (i.e. whether or not the workpiece holding apparatus 3 is in an operative state).

By connecting the control apparatus 5 to the press-in instruction switch 7, the control apparatus 5 detects the rough positioning state of the window 10. More specifically, when the press-in instruction switch 7 is switched ON by being pressed after the operator has confirmed that the window 10 has been roughly positioned, a corresponding ON signal is input into the control apparatus 5. Accordingly, the control apparatus 5, having detected the rough positioning state, outputs an operation command relating to the articulated robot 2, whereby the operation of the power assist apparatus 1 is shifted to an operation for pressing the window 10 against the body 11 (press-in operation).

A position information map relating to the workpiece holding apparatus 3 is stored in the control apparatus 5 in advance. The position information map includes information (track information) relating to a track that is suitable as a conveyance path for a conveyance subject (the window 10 or the like). The control apparatus 5 controls operations of the articulated robot 2 on the basis of this track information such that the workpiece holding apparatus 3 is displaced along the track. Further, the control apparatus 5 varies the operation condition of the motors 2a, 2b and the brake mechanism 4a in accordance with the position information relating to the workpiece holding apparatus 3.

Further, a vehicle type information map relating to an automobile is stored in the control apparatus 5 in advance. Then, in accordance with the type of an automobile serving as the attachment subject, the control apparatus 5 selectively switches the track information described above, automatically modifies information relating to an appropriate angle for window attachment, and so on.

Note that the power assist apparatus of the invention is not limited to a constitution including a plurality of contact pressure sensors 3e, as in the power assist apparatus 1 according to this embodiment, and may be applied to a power assist apparatus having a single contact pressure sensor, for example.

Figure 4:
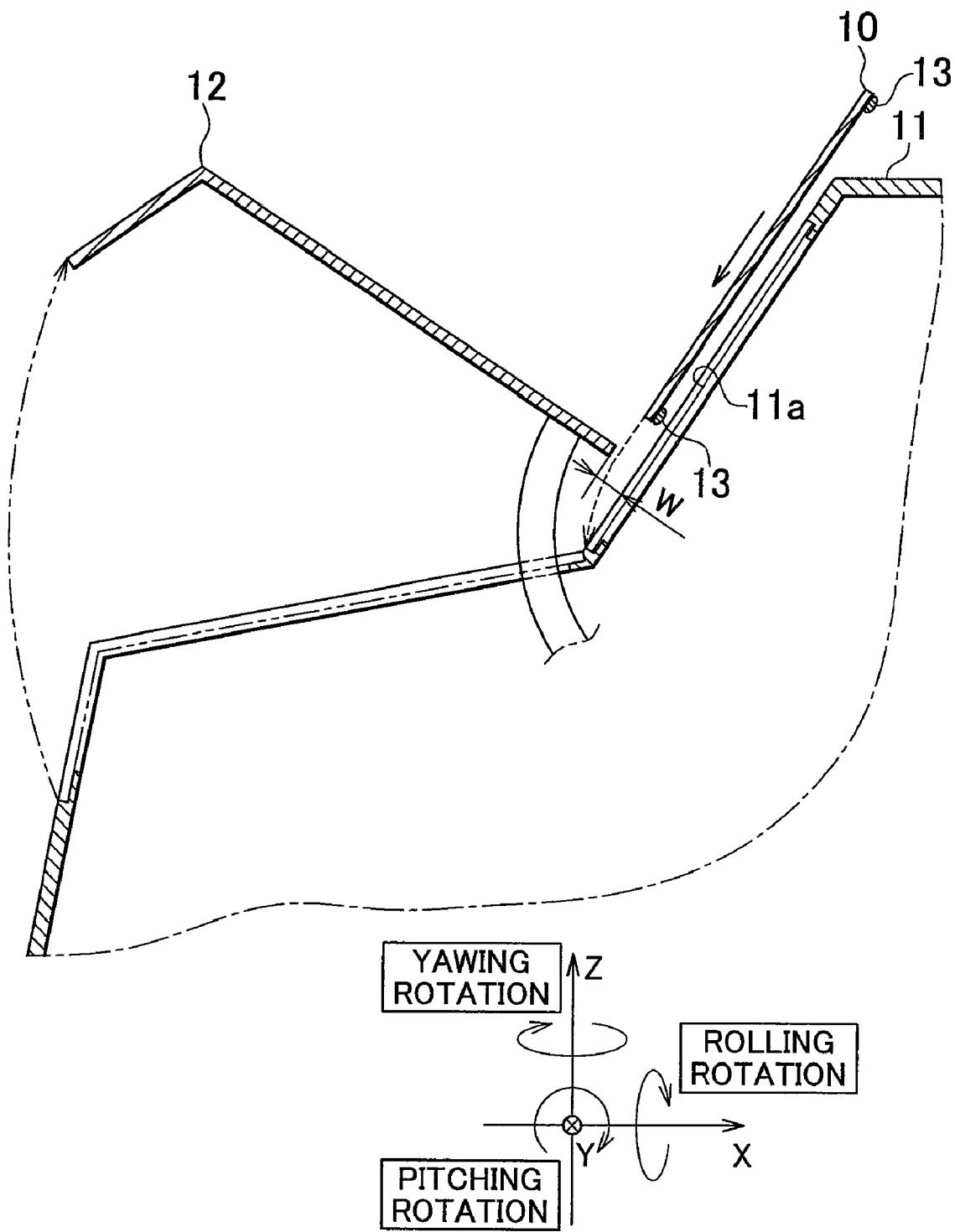
FIG. 4 is an illustrative view showing an outline of a window and an attachment subject member (body) thereof, according to an embodiment of the invention.
Figure 5:
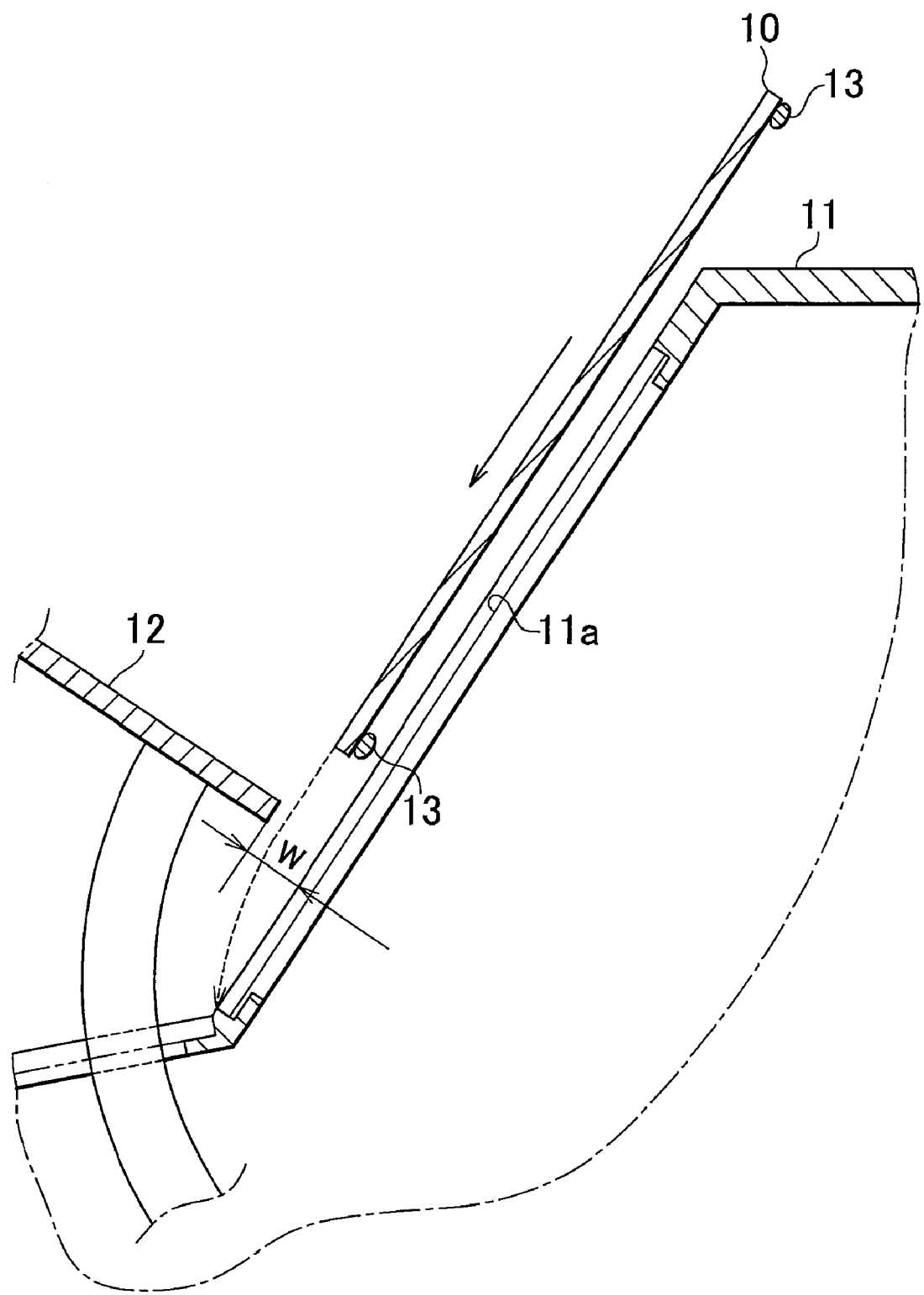
FIG. 5 is an enlarged illustrative view showing a window attachment surface of the body.
Figure 8:
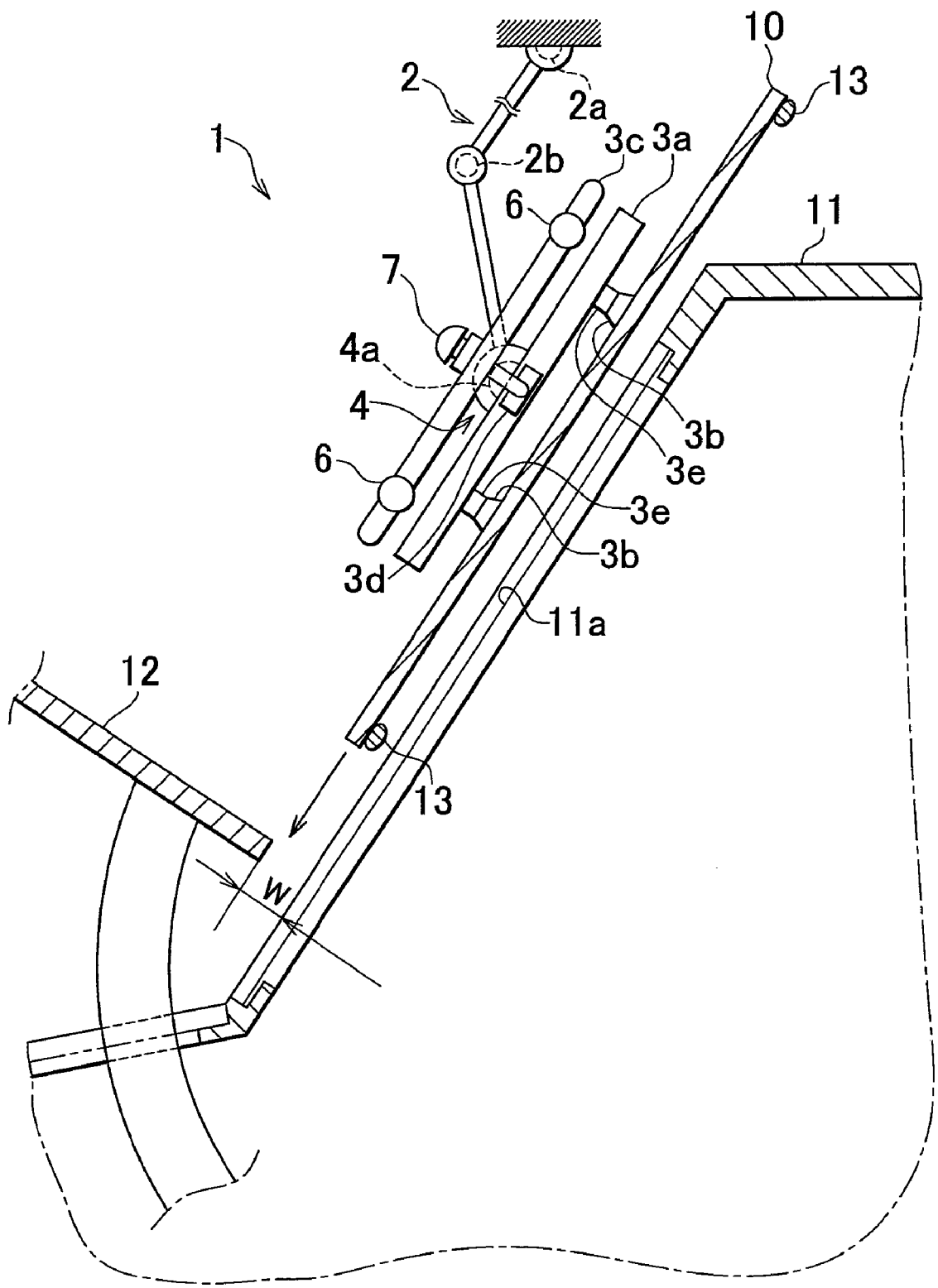
FIG. 8 is a schematic diagram showing a step 1 of the window attachment operation using the power assist apparatus according to an embodiment of the invention.
Figure 9:
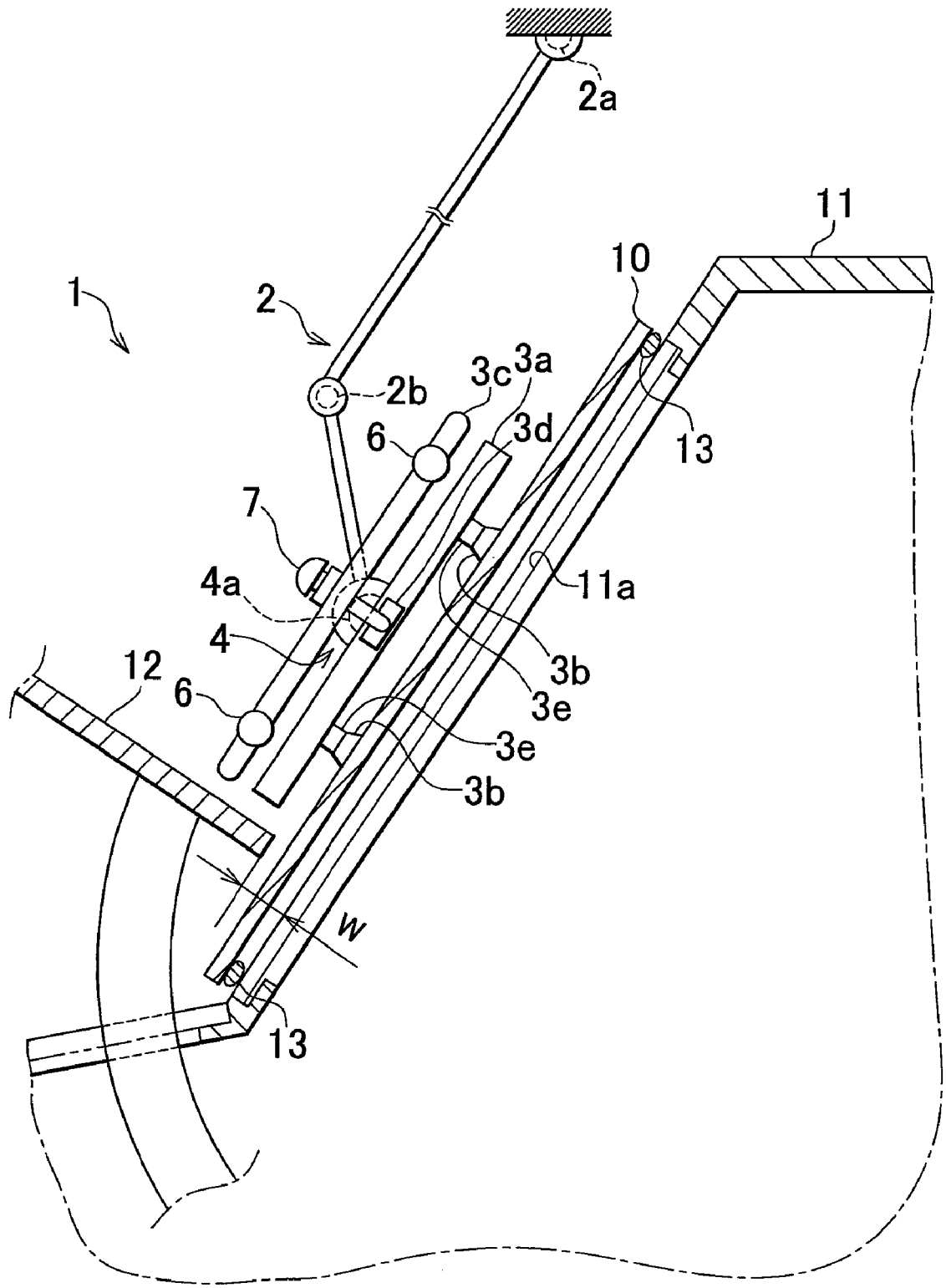
FIG. 9 is a schematic diagram showing a step 2 to a step 3 of the window attachment operation using the power assist apparatus according to an embodiment of the invention.
Figure 10:
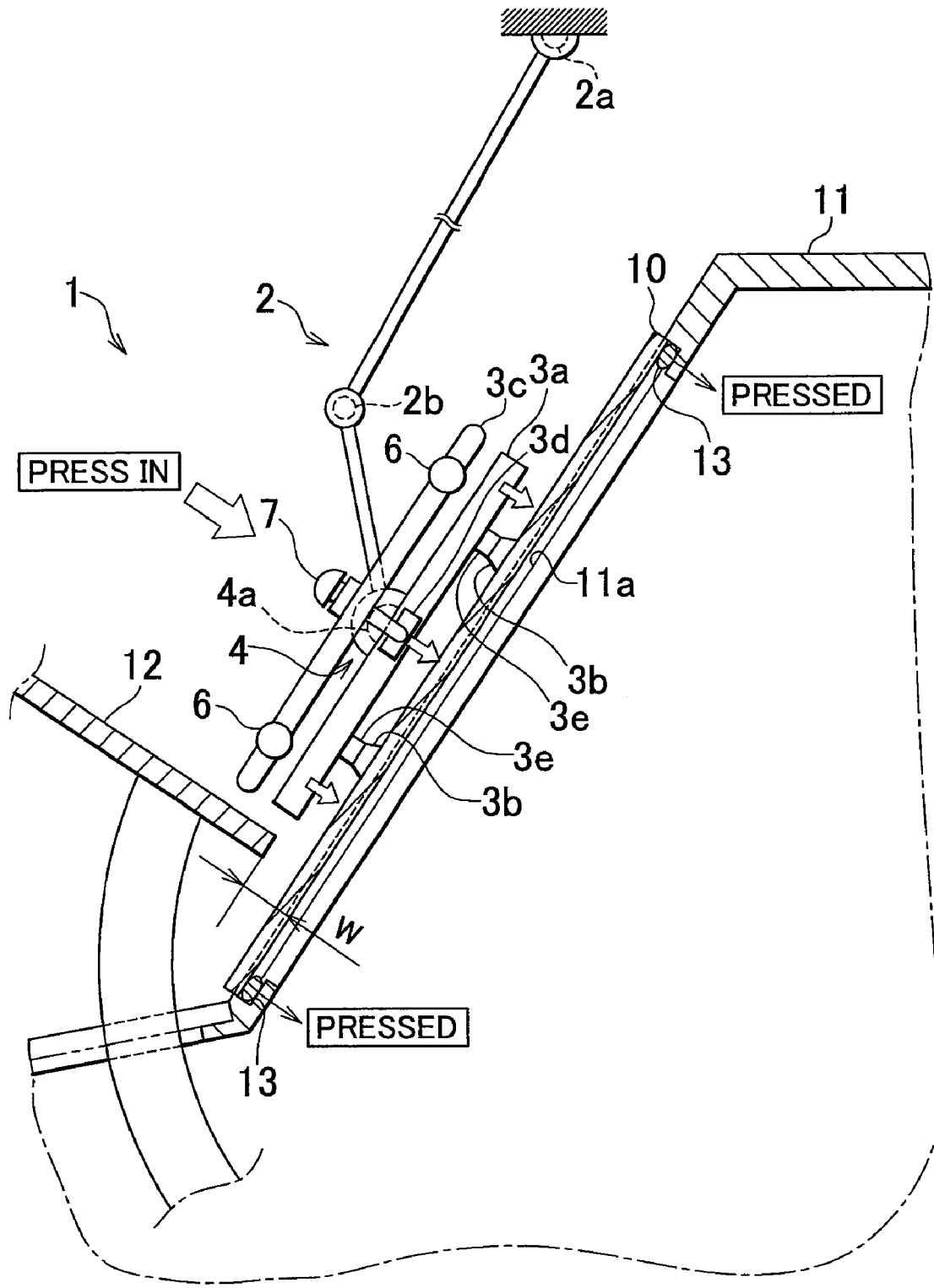
FIG. 10 is a schematic diagram showing a step 4 to a step 5 of the window attachment operation using the power assist apparatus according to an embodiment of the invention.
Figure 11:
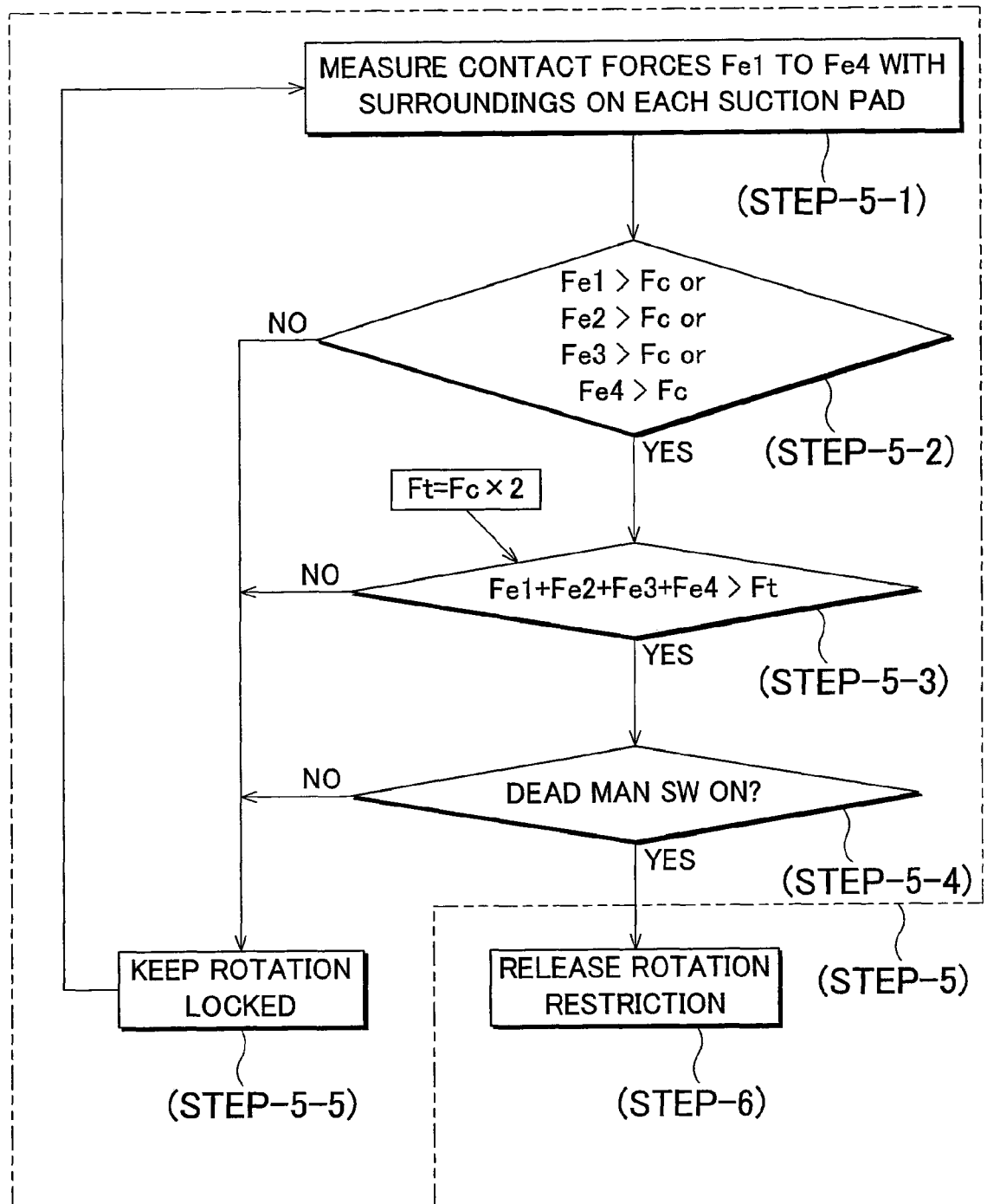
FIG. 11 is a control flowchart showing the step 5 of the window attachment operation using the power assist apparatus according to an embodiment of the invention.
Figure 12:
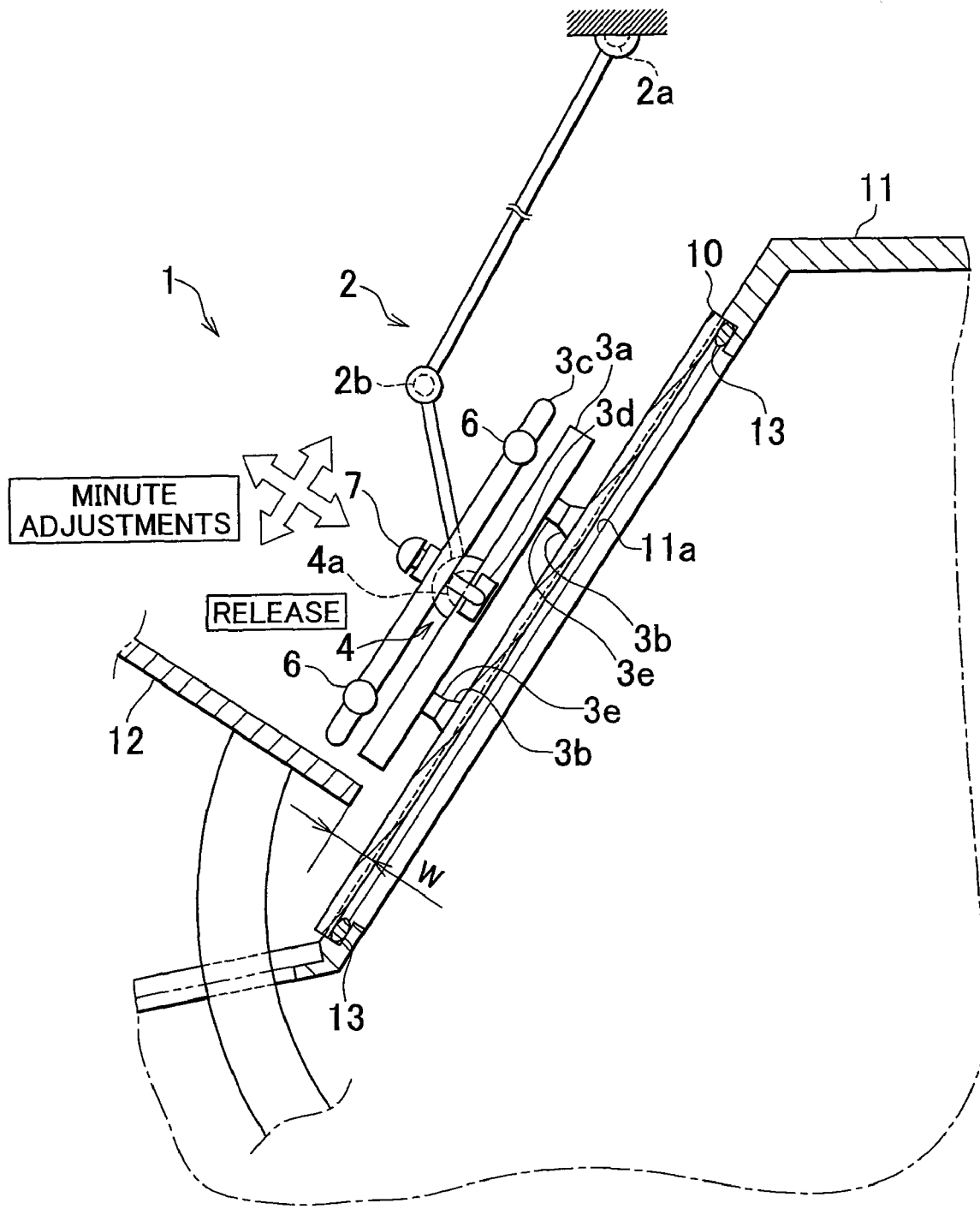
FIG. 12 is a schematic diagram showing a step 6 to a step 8 of the window attachment operation using the power assist apparatus according to an embodiment of the invention.
Figure 13:
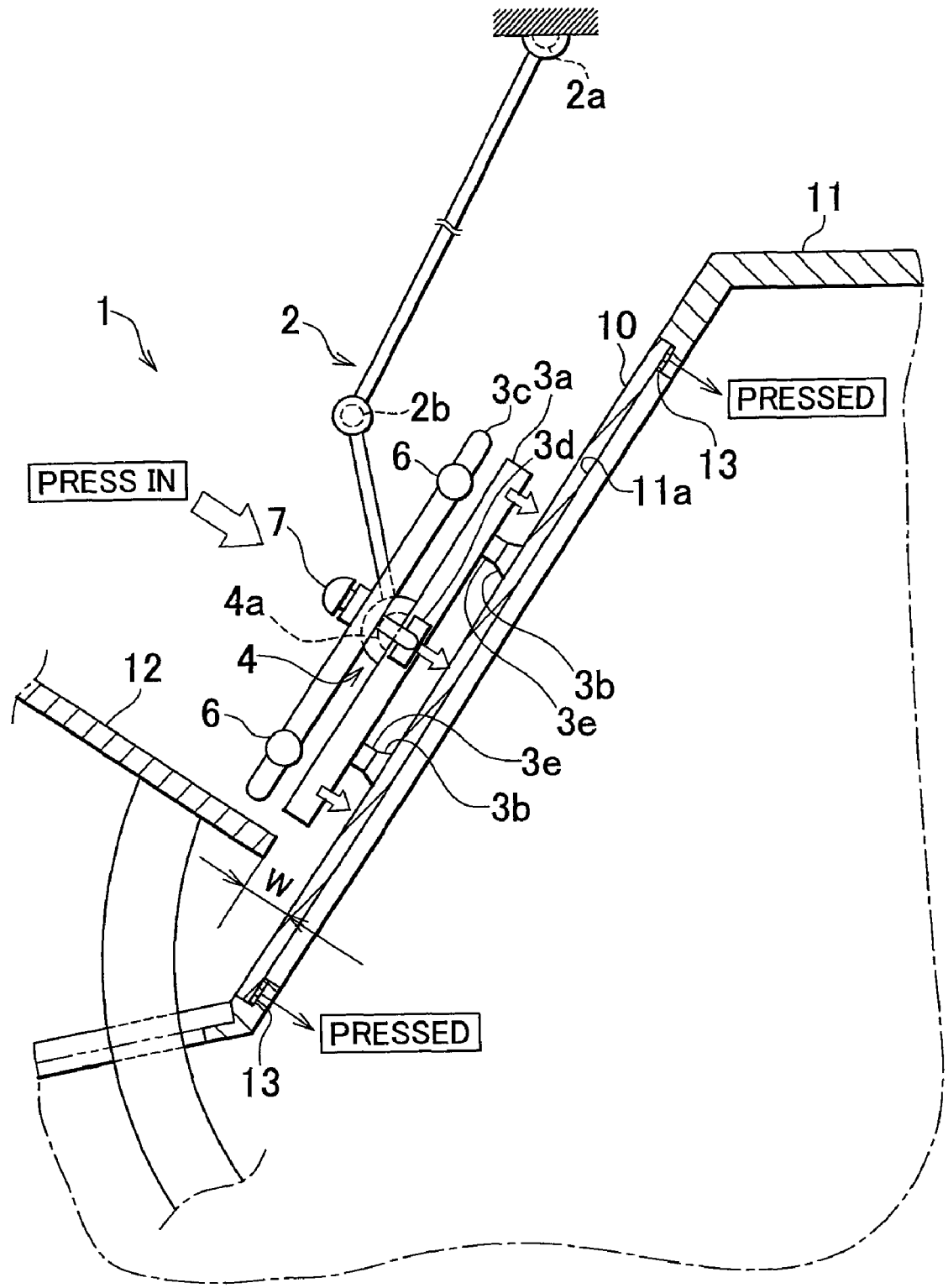
FIG. 13 is a schematic diagram showing a step 9 of the window attachment operation using the power assist apparatus according to an embodiment of the invention.
Figure 14:
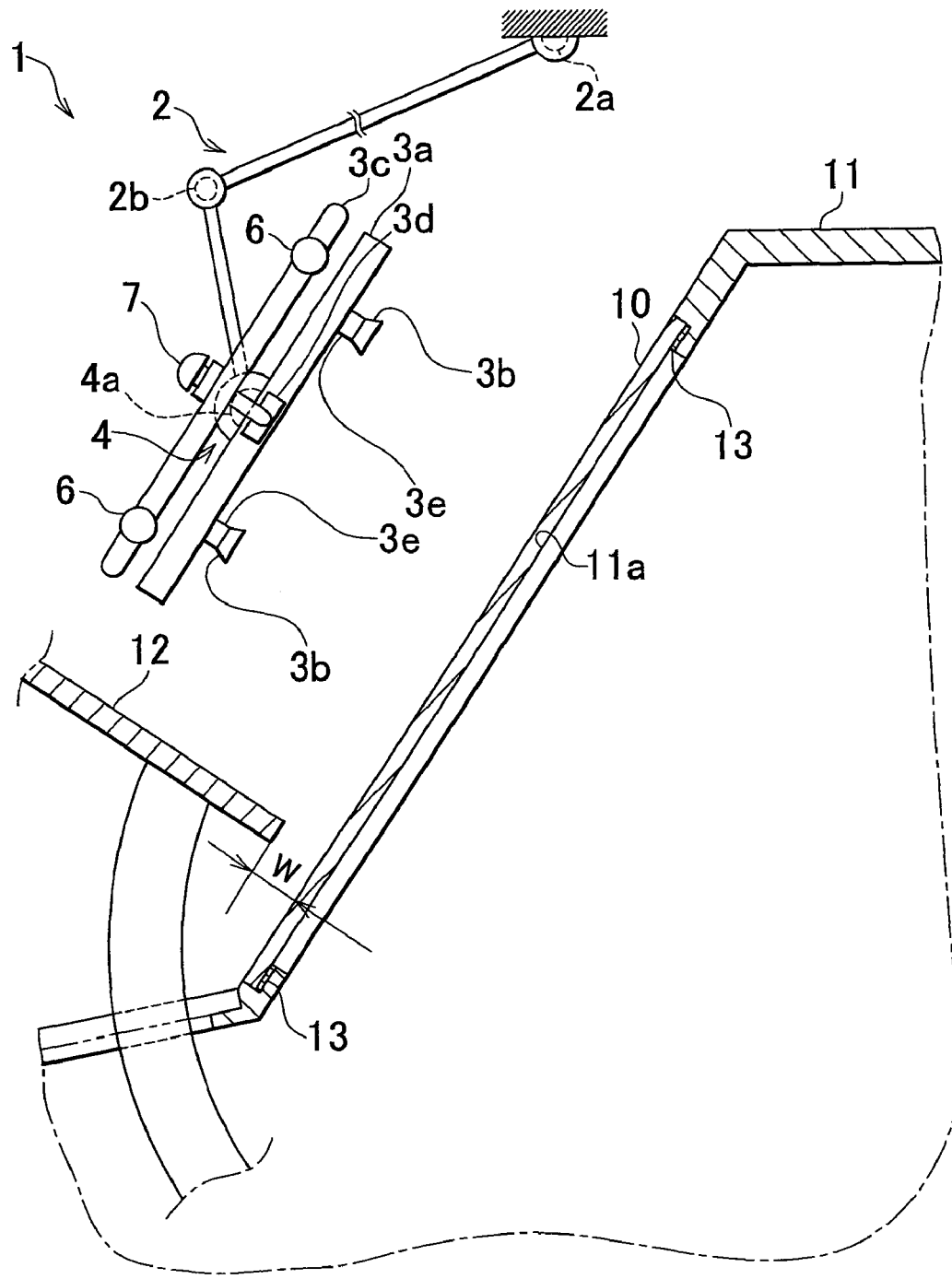
FIG. 14 is a schematic diagram showing a step 10 of the window attachment operation using the power assist apparatus according to an embodiment of the invention.

Next, a series of steps of an attachment operation performed by the power assist apparatus 1 according to an embodiment of the invention in relation to the window 10 will be described using FIGS. 4 to 14. FIG. 4 is an illustrative view showing an outline of a window and an attachment subject member (body) thereof, according to an embodiment of the invention. FIG. 5 is an enlarged illustrative view showing a window attachment surface of the body. FIG. 6 is an operation flowchart showing an example of a window attachment operation using the power assist apparatus according to an embodiment of the invention. FIG. 7 is an illustrative view showing a restriction state of a free joint of the power assist apparatus according to an embodiment of the invention at each step. FIG. 8 is a schematic diagram showing a step 1 of the window attachment operation using the power assist apparatus according to an embodiment of the invention. FIG. 9 is a schematic diagram showing a step 2 to a step 3 of the window attachment operation using the power assist apparatus according to an embodiment of the invention. FIG. 10 is a schematic diagram showing a step 4 to a step 5 of the window attachment operation using the power assist apparatus according to an embodiment of the invention. FIG. 11 is a control flowchart showing the step 5 of the window attachment operation using the power assist apparatus according to an embodiment of the invention. FIG. 12 is a schematic diagram showing a step 6 to a step 8 of the window attachment operation using the power assist apparatus according to an embodiment of the invention. FIG. 13 is a schematic diagram showing a step 9 of the window attachment operation using the power assist apparatus according to an embodiment of the invention. FIG. 14 is a schematic diagram showing a step 10 of the window attachment operation using the power assist apparatus according to an embodiment of the invention. Note that for ease of description, it is assumed that the power assist apparatus is provided on an XYZ coordinate system shown in FIG. 4, wherein rotation about the X axis denotes rolling rotation, rotation about the Y axis denotes pitching rotation, and rotation about the Z axis denotes yawing rotation.

In this embodiment, an example in which a series of operations is performed to attach a window to a body of an automobile using a power assist apparatus will be described. Note that in this embodiment, the power assist apparatus is used in a window attachment operation, but the power assist apparatus of the invention is not limited to this application.

As shown in FIGS. 4 and 5, in an operation to attach the window 10 to a window attachment surface 11a formed on a body 11 of an automobile, the window 10 must be conveyed to the window attachment surface 11a through a gap W between the body 11 and a luggage hatch 12. Furthermore, an adhesive 13 is applied to a peripheral edge portion of the window 10, and therefore conveyance must be performed such that the adhesive 13 does not adhere to unnecessary locations of the body 11 during conveyance of the window 10.

More specifically, if the attitude of the window 10 is disturbed during conveyance in the operation to attach the window 10 using the power assist apparatus 1, the window 10 may contact the body 11 and the luggage hatch 12, and as a result, the window 10, the body 11, and the luggage hatch 12 may break or the adhesive 13 may adhere to unnecessary locations of the body 11 and the luggage hatch 12.

The power assist apparatus according to this embodiment is formed to prevent disturbance of the attitude of the workpiece during conveyance such that when the workpiece is conveyed through a gap in the attachment subject, breakage of and damage to the workpiece and so on can be prevented and the workpiece can be conveyed efficiently. Note that although the power assist apparatus according to this embodiment is particularly effective in cases where the workpiece is conveyed through a gap in the attachment subject, the power assist apparatus is not limited to such cases, and also achieves efficient conveyance of the workpiece in cases where the likelihood of contact between the workpiece and the attachment subject is low. An attachment operation performed by the power assist apparatus 1 according to this embodiment on the window 10 will be described in detail below.

(Conveyance step) As shown in FIGS. 6 and 8, first, the widow 10 is held by the workpiece holding apparatus 3 at a rolling direction incline corresponding to the angle of incline of the body 11. In this state, the operator operates the power assist apparatus 1 to convey the window 10 along the incline of the body 11 in accordance with a pre-taught conveyance path while receiving assistance from the power assist apparatus 1 (step 1).

As shown in FIG. 7, at this time, the brake mechanism 4a is held in an operative state by a command from the control apparatus 5 such that rotation of the free joint 4 in all of the rolling, pitching, and yawing directions is restricted (locked). Thus, the workpiece holding apparatus 3 is held at a predetermined angle.

(Positioning step) Next, as shown in FIGS. 6 and 9, the operator operates the power assist apparatus 1 to convey the window 10 to a position removed from the window attachment surface 11a of the body 11 by a substantially fixed distance upward in a vertical direction relative to the angle of the window attachment surface 11a. This position is taught to the power assist apparatus 1 in advance, and therefore rough positioning of the window 10 is achieved autonomously by the power assist apparatus 1. At this time, the operator confirms by sight that rough positioning of the window 10 relative to the window attachment surface 11a has been achieved by the power assist apparatus 1 (step 2).

As shown in FIG. 7, at this time, the brake mechanism 4a is held in the operative state by a command from the control apparatus 5 such that rotation of the free joint 4 in all of the rolling, pitching, and yawing directions is restricted (locked). Thus, the workpiece holding apparatus 3 remains held at the predetermined angle.

(First press-in instruction step) Next, as shown in FIGS. 6 and 9, the operator presses the press-in instruction switch 7 after confirming by sight that rough positioning of the window 10 relative to the window attachment surface 11a has been achieved by the power assist apparatus 1 (step 3).

(First press-in step) When the operator presses the press-in instruction switch 7, a corresponding signal is input into the control apparatus 5. A command is then issued to the power assist apparatus 1 from the control apparatus 5, whereby the power assist apparatus 1 operates autonomously to convey the window 10 in a direction approaching the window attachment surface 11a along the pre-taught conveyance path.

The window 10 eventually comes into contact with the window attachment surface 11a, but conveyance of the window 10 in the direction approaching the window attachment surface 11a continues thereafter in accordance with the autonomous operation of the power assist apparatus 1 such that the window 10 is pressed into the window attachment surface 11a. At this time, the window 10 is pressed against the window attachment surface 11a (step 4).

As shown in FIG. 7, at this time, the brake mechanism 4a is held in the operative state by a command from the control apparatus 5 such that rotation of the free joint 4 in all of the rolling, pitching, and yawing directions is restricted (locked). Thus, the workpiece holding apparatus 3 remains held at the predetermined angle.

(First pressing force detection step) Next, as shown in FIGS. 6 and 10, the contact pressure sensor 3e detects the pressing force generated when the window 10 is pressed against the window attachment surface 11a by the autonomous operation of the power assist apparatus 1. The detected pressing force is input into the control apparatus 5, whereupon the control apparatus 5 determines the pressing force on the basis of a control flow shown in FIG. 11. Note that the workpiece holding apparatus 3 according to this embodiment includes a total of four contact pressure sensors 3e, but the control method for a power assist apparatus according to this embodiment may be applied to a power assist apparatus having a workpiece holding apparatus that includes at least two contact pressure sensors. Further, the invention may be applied easily to a power assist apparatus having only one contact pressure sensor by making small amendments to the control method according to this embodiment.

As shown in FIG. 11, in a step 5, the contact pressure sensors 3e detect the pressing force generated when the window 10 is pressed against the window attachment surface 11a by the autonomous operation of the power assist apparatus 1 (step 5-1). Pressing forces Fe1 to Fe4 detected respectively by the four contact pressure sensors 3e are then input into the control apparatus 5.

(Pressing force determination step) First, the control apparatus 5 compares a preset first threshold Fc to the pressing forces Fe1 to Fe4 (step 5-2). Here, when all of the pressing forces Fe1 to Fe4 are equal to or smaller than the first threshold Fc, conveyance (i.e. pressing in) of the window 10 in the direction approaching the window attachment surface 11a is continued in accordance with the autonomous operation of the power assist apparatus 1.

Further, as shown in FIG. 7, the brake mechanism 4a is held in the operative state by a command from the control apparatus 5 such that rotation of the free joint 4 in all of the rolling, pitching, and yawing directions is restricted (locked). Thus, the workpiece holding apparatus 3 remains held at the predetermined angle (step 5-5).

When one or more of the pressing forces Fe1 to Fe4 exceeds the first threshold Fc, on the other hand, the routine advances to a subsequent determination. In other words, the routine only advances to the next determination when one or more of the pressing forces Fe1 to Fe4 exceeds the first threshold Fc.

When one or more of the pressing forces Fe1 to Fe4 exceeds the first threshold Fc, the control apparatus 5 determines a sum total (Fe1+Fe2+Fe3+Fe4) of the pressing forces Fe1 to Fe4, and compares this sum total to a second threshold Ft (step 5-3). When the sum total (Fe1+Fe2+Fe3+Fe4) of the pressing forces Fe1 to Fe4 is equal to or smaller than the second threshold Ft, conveyance (i.e. pressing in) of the window 10 in the direction approaching the window attachment surface 11a is continued through the autonomous operation of the power assist apparatus 1. Note that when the number (N) of contact pressure sensors is at least two but not four, for example, the processing of the steps 5-2 and 5-3 is performed in relation to N pressing forces Fe1 to FeN. Further, when a single contact pressure sensor is provided, only one pressing force Fe1 is obtained, and therefore the step 5-3 may be omitted and instead, a determination as to whether or not Fe1>Ft may be made in the step 5-3.

Further, as shown in FIG. 7, in this case the brake mechanism 4a is held in the operative state by a command from the control apparatus 5 such that rotation of the free joint 4 in all of the rolling, pitching, and yawing directions is restricted (locked). Thus, the workpiece holding apparatus 3 remains held at the predetermined angle (step 5-5). When the sum total (Fe1+Fe2+Fe3+Fe4) of the pressing forces Fe1 to Fe4 exceeds the second threshold Ft, on the other hand, the routine advances to a subsequent determination.

(Dead man switch determination step) When the sum total (Fe1+Fe2+Fe3+Fe4) of the pressing forces Fe1 to Fe4 exceeds the second threshold Ft, a further determination is made in accordance with the pressed state of the dead man switch 6, which is detected by the control apparatus 5 (step 5-4). More specifically, the routine only advances to the next determination when one or more of the pressing forces Fe1 to Fe4 exceeds the first threshold Fc and the sum total (Fe1+Fe2+Fe3+Fe4) of the pressing forces Fe1 to Fe4 exceeds the second threshold Ft.

(Brake release determination step) When one or more of the pressing forces Fe1 to Fe4 exceeds the first threshold Fc, the sum total (Fe1+Fe2+Fe3+Fe4) of the pressing forces Fe1 to Fe4 exceeds the second threshold Ft, and the dead man switch 6 has not been pressed (in other words, when the operator is not operating the workpiece holding apparatus 3), conveyance (i.e. pressing in) of the window 10 in the direction approaching the window attachment surface 11a is continued in accordance with the autonomous operation of the power assist apparatus 1.

Further, as shown in FIG. 7, in this case the brake mechanism 4a is held in the operative state by a command from the control apparatus 5 such that rotation of the free joint 4 in all of the rolling, pitching, and yawing directions is restricted (locked). Thus, the workpiece holding apparatus 3 remains held at the predetermined angle (step 5-5).

When one or more of the pressing forces Fe1 to Fe4 exceeds the first threshold Fc, the sum total (Fe1+Fe2+Fe3+Fe4) of the pressing forces Fe1 to Fe4 exceeds the second threshold Ft, and the dead man switch 6 has been pressed (in other words, when the operator is operating the workpiece holding apparatus 3), on the other hand, the operative state of the brake mechanism 4a is released in accordance with a command from the control apparatus 5 such that the free joint 4 can rotate freely in each of the rolling, pitching, and yawing directions, as shown in FIG. 7 (step 6).

In other words, the brake mechanism 4a is released such that the free joint 4 can rotate freely only when one or more of the pressing forces Fe1 to Fe4 exceeds the first threshold Fc, the sum total (Fe1+Fe2+Fe3+Fe4) of the pressing forces Fe1 to Fe4 exceeds the second threshold Ft, and the dead man switch 6 is ON.

Hence, the control method for the power assist apparatus 1 according to this embodiment is a method for controlling the power assist apparatus 1, which includes the workpiece holding apparatus 3 having the plurality of suckers 3b serving as holding portions and the contact pressure sensors 3e provided respectively in the plurality of suckers 3b, wherein, in the pressing force determination step, the control apparatus 5 determines whether or not at least one of the plurality of pressing forces Fe1 to Fe4 detected by the contact pressure sensors 3e of the plurality of suckers 3b exceeds the preset first threshold Fc, and determines whether or not the sum total (i.e. Fe1+Fe2+Fe3+Fe4) of the plurality of pressing forces detected by the contact pressure sensors 3e of the plurality of suckers 3b exceeds the preset second threshold Ft. Thus, minute adjustments to the attachment position can be made by the operator after the attitude of the window (i.e. the workpiece) 10 is stabilized during conveyance, and as a result, the attitude of the window 10 can be stabilized during conveyance and positioning accuracy can be secured.

Moreover, at this time, conveyance of the window 10 in the direction approaching the window attachment surface 11a in accordance with the autonomous operation of the power assist apparatus 1 is interrupted. In this embodiment, as shown in FIG. 11, Ft=2Fc, or in other words, the value of the second threshold Ft is defined as being twice the value of the first threshold Fc. According to this definition, the thresholds can be set easily and appropriately. Note that this method of determining the first threshold Fc and second threshold Ft is merely an example, and another determination method may be used.

Hence, in the control method for the power assist apparatus 1 according to this embodiment, the value of the second threshold Ft is set to be twice the value of the first threshold Fc. Accordingly, the attitude of the window (i.e. the workpiece) 10 can be stabilized reliably during conveyance. Furthermore, minute adjustments to the attachment position can be made by the operator after the attitude of the window 10 has been reliably stabilized.

(Minute positioning adjustment step) As shown in FIGS. 6 and 12, when the operative state of the brake mechanism 4a is released in accordance with a command from the control apparatus 5 such that the free joint 4 can rotate freely, minute adjustments to the position of the workpiece holding apparatus 3 can be made by the operator (step 7). Hence, when the attitude of the body 11 is disturbed or the position of the window 10 is offset from the window attachment surface 11*a* following rough positioning, for example, the operator can correct the attitude of the workpiece holding apparatus 3, and as a result, the window 10 can be attached to the window attachment surface 11*a* accurately.

(Second press-in instruction step) Next, as shown in FIGS. 6 and 12, the operator presses the press-in instruction switch 7 again after making minute adjustments and confirming by sight or the like that the window 10 is positioned accurately relative to the window attachment surface 11*a* (step 8).

As shown in FIG. 7, at this time, the brake mechanism 4*a* is returned to the operative state by a command from the control apparatus 5, whereby the free joint 4 is locked such that the workpiece holding apparatus 3 is held at an angle obtained following accurate positioning thereof relative to the window attachment surface 11*a*.

(Second press-in step) As shown in FIGS. 6 and 13, when the operator presses the press-in instruction switch 7 again, a corresponding signal is input into the control apparatus 5. A command is then issued to the power assist apparatus 1 from the control apparatus 5, whereby the power assist apparatus 1 performs another autonomous operation to convey (i.e. press in) the window 10 further in the direction approaching the window attachment surface 11*a* along the pre-taught conveyance path.

As shown in FIG. 7, at this time, the brake mechanism 4*a* remains held in the operative state in accordance with the command from the control apparatus 5, and therefore the free joint 4 is rotationally restricted (locked) in all of the rolling, pitching, and yawing directions such that the workpiece holding apparatus 3 is held at the angle obtained following accurate positioning thereof relative to the window attachment surface 11*a*.

(Second pressing force detection step) Next, as shown in FIGS. 6 and 13, the pressing force generated when the window 10 is pressed into the window attachment surface 11*a* by the autonomous operation of the power assist apparatus 1 is detected by the contact pressure sensors 3*e* (step 9). The pressing forces Fe1 to Fe4 detected by the four contact pressure sensors 3*e* are then input into the control apparatus 5.

The control apparatus 5 compares a preset third threshold Fz to the pressing forces Fe1 to Fe4. Here, when all of the pressing forces Fe1 to Fe4 are smaller than the third threshold Fz, conveyance of the window 10 in the direction approaching the window attachment surface 11*a* is continued in accordance with the autonomous operation of the power assist apparatus 1. Further, the brake mechanism 4*a* is held in the operative state in accordance with the command from the control apparatus 5, and therefore the free joint 4 remains rotationally restricted (locked) in all of the rolling, pitching, and yawing directions such that the workpiece holding apparatus 3 is held at a predetermined angle.

When all of the pressing forces Fe1 to Fe4 exceed the third threshold Fz, it is determined that the window 10 is pressed sufficiently against the body 11, and therefore conveyance (i.e. pressing in) of the window 10 in the direction approaching the window attachment surface 11*a* by the autonomous operation of the power assist apparatus 1 is terminated.

As shown in FIG. 14, when conveyance (i.e. pressing in) of the window 10 in the direction approaching the window attachment surface 11*a* by the autonomous operation of the power assist apparatus 1 is terminated, the hold of the workpiece holding apparatus 3 on the window 10 is released, whereby attachment of the window 10 is complete (step 10).

As shown in FIGS. 7 and 14, at this time, the operative state of the brake mechanism 4*a* is maintained in accordance with a command from the control apparatus 5 in preparation for an operation to return the power assist apparatus 1 to an operation start position, and therefore the free joint 4 remains rotationally restricted (locked) in all of the rolling, pitching, and yawing directions such that the workpiece holding apparatus 3 is held at the predetermined angle. Thus, the series of window attachment operations ends.

This embodiment is a control method for the power assist apparatus 1, which includes the workpiece holding apparatus 3 having the suckers 3*b* serving as holding portions for holding the window 10 serving as a workpiece, an arm (i.e. the articulated robot 2) for supporting the workpiece holding apparatus 3, the free joint 4 for supporting (connecting) the workpiece holding apparatus 3 rotatably relative to the articulated robot 2, the brake mechanism 4*a* that is capable of restricting rotation of the free joint 4, the control apparatus 5 for controlling the state of restriction established by the brake mechanism 4*a*, the contact pressure sensors 3*e* for detecting the pressing force that acts on the window 10 held by the workpiece holding apparatus 3, and the dead man switch 6 provided on the workpiece holding apparatus 3. The control method according to this embodiment includes a first pressing force detection step in which the pressing forces Fe1 to Fe4 acting on the window 10 held by the workpiece holding apparatus 3 are detected by the contact pressure sensors 3*e* and detection results are input into the control apparatus 5, a pressing force determination step in which the control apparatus 5 determines whether or not the pressing forces Fe1 to Fe4 detected by the contact pressure sensors 3*e* exceed preset thresholds (the first threshold Fc and the second threshold Ft), a dead man switch determination step in which the control apparatus 5 determines whether or not the dead man switch 6 is ON, and a brake release determination step in which the control apparatus 5 determines whether or not to release the rotation restriction applied to the joint portions by the brake in accordance with the detection results of the pressing force detection step, the determination result of the pressing force determination step, and the determination result of the dead man switch determination step.

Further, the power assist apparatus 1 according to this embodiment includes the workpiece holding apparatus 3 having the plurality of suckers 3*b* serving as holding portions for holding the window 10 serving as a workpiece, the articulated robot 2 for supporting the workpiece holding apparatus 3, the free joint 4 for supporting (connecting) the suckers 3*b* rotatably relative to the articulated robot 2, the brake mechanism 4*a* for restricting rotation of the free joint 4, the control apparatus 5 for controlling the state of restriction established by the brake mechanism 4*a*, the plurality of contact pressure sensors 3*e* provided respectively in the suckers 3*b* for detecting the pressing forces Fe1 to Fe4 that act on the window 10, and the dead man switch 6 provided on the workpiece holding apparatus 3. When at least one of the plurality of pressing forces Fe1 to Fe4 detected by the contact pressure sensors 3*e* of the plurality of suckers 3*b* exceeds the preset first threshold Fc, the sum total (Fe1+Fe2+Fe3+Fe4) of the plurality of pressing forces Fe1 to Fe4 detected by the contact pressure sensors 3*e* of the plurality of suckers 3*b* exceeds the preset second threshold Ft, and the dead man switch 6 is ON, the control apparatus 5 releases the rotation restriction applied to the free joint 4 by the brake mechanism 4*a*.

By constituting the power assist apparatus 1 and the control method thereof in this manner, the attitude of the window (i.e. the workpiece) 10 can be stabilized during conveyance. As a result, the operator can convey the window 10 smoothly, enabling an improvement in the efficiency of the conveyance operation. Further, contact between the window 10 and the attachment subject member (the body 11 or the luggage hatch 12) during conveyance can be prevented, and therefore breakage of or damage to the window 10 or the attachment subject member (the body 11 or the luggage hatch 12) can be prevented. Moreover, minute adjustments to the attachment position can be made by the operator after the attitude of the window 10 has been stabilized during conveyance, and as a result, the attitude of the window 10 can be stabilized during conveyance and positioning accuracy can be secured in relation to the window 10.

While some embodiments of the invention have been illustrated above, it is to be understood that the invention is not limited to details of the illustrated embodiments, and may be embodied with various changes, modifications or improvements, which may occur to those skilled in the art, without departing from the spirit and scope of the invention.

What is claimed is:

1. A control method for a power assist apparatus that comprises a workpiece holding apparatus having a plurality of holding portions for holding a workpiece; an arm for supporting the workpiece holding apparatus; a joint portion for supporting the workpiece holding apparatus rotatably relative to the arm; a brake for restricting rotation of the joint portion; a control apparatus for controlling a state of restriction established by the brake; a plurality of pressing force detection sensors which are provided respectively in the plurality of holding portions and detect a pressing force acting on the workpiece held by the workpiece holding apparatus; and a dead man switch provided on the workpiece holding apparatus, wherein the control method comprises:

a pressing force detection step in which the pressing force acting on the workpiece held by the workpiece holding apparatus is detected by the pressing force detection sensors, and a detection result is input to the control apparatus;

a pressing force determination step in which the control apparatus determines whether or not the pressing force detected by the pressing force detection sensors exceeds a preset threshold;

a dead man switch determination step in which the control apparatus determines whether or not the dead man switch is ON; and a brake release determination step in which the control apparatus determines whether or not to release rotation restriction applied to the joint portions by the brake in accordance with a detection result of the pressing force detection step, a determination result of the dead man switch determination step, wherein, in the pressing force determination step, the control apparatus determines whether at least one pressing force of a plurality of pressing forces detected by the pressing force detection sensors of the plurality of holding portions exceeds a preset first threshold, and determines whether a sum total of the plurality of pressing forces detected by the pressing force detection sensors of the plurality of holding portions exceeds a preset second threshold.

2. The control method according to claim 1, wherein the second threshold is set to be twice the first threshold.

3. A power assist apparatus that comprises a workpiece holding portion having a plurality of holding portions for holding a workpiece;

an arm for supporting the workpiece holding portion;

a joint portion for supporting the workpiece holding portion rotatably relative to the arm;

a brake for restricting rotation of the joint portion;

a control apparatus for controlling tie-rotation a state of restriction established by the brake;

a plurality of pressing force detection sensors which are provided respectively in the plurality of holding portions and detect a pressing force acting on the workpiece; and a dead man switch provided on the workpiece holding portion, wherein, when at least one pressing force of a plurality of pressing forces detected by the pressing force detection sensors of the plurality of holding portions exceeds a preset first threshold, a sum total of the plurality of pressing forces detected by the force detection sensors of the plurality of holding portions exceeds a preset second threshold, and the dead man switch is ON, the control apparatus releases rotation restriction applied to the joint portion by the brake.

4. The power assist apparatus according to claim 3, wherein the second threshold is set to be twice the first threshold.

* * * * *

UNITED STATES PATENT AND TRADEMARK OFFICE
CERTIFICATE OF CORRECTION

| | |
|---|---|
| PATENT NO. | : 7,953,509 B2 |
| APPLICATION NO. | : 12/392701 |
| DATED | : May 31, 2011 |
| INVENTOR(S) | : Hideyuki Murayama |

Page 1 of 1

It is certified that error appears in the above-identified patent and that said Letters Patent is hereby corrected as shown below:

In the Title Page: Before "(51) Int. Cl." Insert

--(30) Foreign Application Priority Data

Feb. 26, 2008 (JP) 2008-045010--.

| Column | Line | |
|---|---|---|
| 14 | 25 | After "controlling" delete "tie-rotation". |

Signed and Sealed this

Twentieth Day of December, 2011

David J. Kappos
*Director of the United States Patent and Trademark Office*